Patented Mar. 17, 1931

1,797,157

UNITED STATES PATENT OFFICE

WILLEM RUDOLFS, OF DAYTON, NEW JERSEY, ASSIGNOR TO NATIONAL ALUMINATE CORPORATION, OF CHICAGO, ILLINOIS, A CORPORATION OF DELAWARE

INCREASING THE RATE OF ANAEROBIC DIGESTION OF SEWAGE SOLIDS

No Drawing. Application filed May 16, 1929. Serial No. 363,717.

The present invention relates to the treatment of sewage solids in digestion tanks where the digestion is performed under conditions favoring the development of anaerobic bacteria. In this treatment of sewage, the organic constituents thereof are attacked by anaerobic bacteria with the resultant formation of comparatively large amounts of gases, among which methane ($CH_4$) predominates; although there are also liberated comparatively small amounts of carbon dioxide and of nitrogen and traces of hydrogen sulfide.

During the said anaerobic digestion of the sewage solids, most of the organic constituents of the sewage are converted into comparatively odorless gases which have, on account of their combustibility, considerable industrial value.

The usual digestion time in anaerobic digestion tanks, including Imhoff tanks, is on the order of from four to six months, and the gas formation, while at first comparatively slow, reaches its maximum during the third month, although gas formation is still evident even at the end of the operation. It is customary to withdraw the digested sludge at the end of the digestion period, to filter off the water therefrom, and to dry the residual material for use as a fertilizer and the like.

One of the objects of the present invention is to accelerate the formation of gases and particularly of methane, during the anaerobic digestion of sewage solids, by accelerating the digestion.

This object is accomplished by the addition to said solids, preferably prior to their introduction into the digestion tanks, of small amounts of sodium aluminate, either in the form of meta-aluminate ($Na_2Al_2O_4$) or of tri-sodium aluminate ($Na_3AlO_3$). The amount required appears to be small and an amount as little as 5.0 parts per million added to the sewage has been found greatly to increase the rate of methane development. The total amount of gas produced is not materially affected, as this is determined by the amount of available digestible organic materials capable of conversion into methane. The effect of the sodium aluminate is, therefore, in all probability, purely catalytic and speeds up, for some reason the theory of which is at present under investigation, the reaction that results in the decomposition of the carbohydrate materials. These are converted into methane, carbon dioxide and water.

The nitrogen is unquestionably derived from the proteid matter and the rate of development of the nitrogen does not appear to be accelerated, whereas that of the methane is. This results in another advantage, in that the gas coming from the digestors has a higher calorific value and is richer in methane. The solids resulting from the digestion have a relatively higher nitrogen content and are therefore more valuable as fertilizers. The digestion time is cut down from 30 to 40 per cent, which, when it is considered that the amount of sewage to be treated for any average size city is enormous, represents a commercial advantage of the greatest possible utility.

The presence of the sodium aluminate does not interfere with the further treatment of the digested sludge and, in fact, appears to exert a beneficial effect in the filtration of the same, as the sludge appears to drain more rapidly.

The effects cannot be accounted for by any change in the hydrogen-ion concentration of the sludge, as the amount of sodium aluminate added is almost infinitesimal as contrasted to the material itself, being on the order of only 5.0 parts per million; whereas the effects obtained are very marked indeed.

In speaking of 5 parts per million, this is predicated upon a suspended solid content in the sewage of approximately 200 parts per million. If the suspended solids are greater than that, then the amount of sodium aluminate added would have to be increased in the same ratio as the increased solids in suspension bear to the ratio given. For example, if the suspended solids are 400 parts per million then the addition of sodium aluminate would have to be from 2 to 10 parts per million of total sewage treated.

While I have described sodium aluminate as the specific reagent employed, it is to be understood that equivalents of sodium aluminate, such as either the meta-aluminate or the tri-sodium aluminate, or alkaline suspension of aluminum oxide are to be considered as synonymous with sodium aluminate in the hereunto appended claims.

What I desire to claim and protect by Letters Patent of the United States is:

1. Treatment of sewage solids in anaerobic digestion tanks which comprises the step of adding to said solids a small amount of sodium aluminate.

2. Treatment of sewage solids by digestion in anaerobic digestion tanks which comprises the step of adding to said solids from 1.0 to 5.0 parts per million of sodium aluminate, on the basis of 200 p.p.m. suspended solids in sewage.

3. The process of increasing the formation of methane during the anaerobic digestion of sewage solids which comprises adding to said sewage solids a small amount of a water soluble aluminate.

4. The process of increasing the formation of methane during the anaerobic digestion of sewage solids which comprises adding to said sewage solids a small amount of sodium aluminate.

5. The process of increasing the formation of methane during the anaerobic digestion of sewage solids which comprises adding to said sewage solids from 1.0 to 5.0 parts per million of sodium aluminate, on the basis of 200 p.p.m. suspended solids in the sewage.

6. The process of accelerating the formation of gases from sewage solids by anaerobic digestion of the same which comprises the step of adding thereto a small amount of sodium aluminate.

7. The process of anaerobic digestion of sewage which comprises the step of carrying out said digestion in the presence of a small amount of sodium aluminate whereby gas formation from the sewage is accelerated.

In witness whereof, I have hereunto subscribed my name.

WILLEM RUDOLFS.